United States Patent
Wu et al.

(10) Patent No.: US 10,360,867 B2
(45) Date of Patent: Jul. 23, 2019

(54) ELECTRONIC PAPER DISPLAY DEVICE

(71) Applicant: E Ink Holdings Inc., Hsinchu (TW)

(72) Inventors: Kun-Heng Wu, Hsinchu (TW);
Feng-Chuan Yeh, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 23 days.

(21) Appl. No.: 15/683,784

(22) Filed: Aug. 23, 2017

(65) Prior Publication Data

US 2018/0068632 A1 Mar. 8, 2018

(30) Foreign Application Priority Data

Sep. 7, 2016 (CN) .......................... 2016 1 0805690

(51) Int. Cl.

| G06F 1/26 | (2006.01) |
|---|---|
| G09G 3/20 | (2006.01) |
| G09G 3/34 | (2006.01) |
| G09G 3/36 | (2006.01) |
| G02F 1/1333 | (2006.01) |
| G06F 1/3234 | (2019.01) |
| G06F 1/3296 | (2019.01) |
| G09G 3/3266 | (2016.01) |

(52) U.S. Cl.
CPC .......... *G09G 3/3685* (2013.01); *G02F 1/1333* (2013.01); *G06F 1/266* (2013.01); *G06F 1/3265* (2013.01); *G06F 1/3296* (2013.01); *G09G 3/20* (2013.01); *G09G 3/3266* (2013.01); *G09G 3/344* (2013.01); *G09G 3/3674* (2013.01); *G09G 2300/0421* (2013.01); *G09G 2310/0289* (2013.01); *G09G 2380/14* (2013.01); *Y02D 10/153* (2018.01); *Y02D 10/172* (2018.01)

(58) Field of Classification Search
CPC ........ G09G 3/20; G09G 3/344; G09G 3/3266; G09G 3/3674; G09G 3/3685; G06F 1/3265; G06F 1/3296; G02F 1/1333
USPC .......... 345/3.1, 173, 174, 204, 212; 359/296
See application file for complete search history.

(56) References Cited

U.S. PATENT DOCUMENTS

| 8,823,722 B1 | 9/2014 | Huang et al. | |
|---|---|---|---|
| 2007/0063959 A1* | 3/2007 | Iwabuchi | G09G 3/2074 345/100 |

(Continued)

FOREIGN PATENT DOCUMENTS

| TW | 200641757 | 12/2006 |
|---|---|---|
| TW | 201005723 | 2/2010 |

*Primary Examiner* — Prabodh M Dharia
(74) *Attorney, Agent, or Firm* — JCIPRNET

(57) ABSTRACT

An electronic paper display device including an electronic paper display substrate and a power supply circuit is provided. An electronic paper display panel and a driving circuit are disposed on the electronic paper display substrate. The power supply circuit is electrically connected to the electronic paper display panel and the driving circuit. The power supply circuit is configured to output a first driving signal to the electronic paper display panel and output a voltage signal to the driving circuit. The power supply circuit includes a level shifter. The power supply circuit outputs a first driving signal to the electronic paper display panel by utilizing the level shifter. The driving circuit includes a source driver. The driving circuit outputs a second driving signal to the electronic paper display panel according to the voltage signal by utilizing the source driver.

10 Claims, 4 Drawing Sheets

(56) References Cited

U.S. PATENT DOCUMENTS

| | | | |
|---|---|---|---|
| 2008/0042926 A1* | 2/2008 | Egi | C09K 11/06 345/32 |
| 2008/0284710 A1* | 11/2008 | Kimura | G02F 1/13454 345/98 |
| 2011/0012907 A1* | 1/2011 | Sakamoto | G09G 3/344 345/555 |
| 2011/0090189 A1* | 4/2011 | Kimura | G09G 3/325 345/204 |
| 2011/0148845 A1* | 6/2011 | Uehara | G09G 3/3629 345/212 |
| 2012/0069064 A1* | 3/2012 | Yamakita | G02F 1/167 345/690 |
| 2012/0229483 A1 | 9/2012 | Li et al. | |
| 2012/0250139 A1* | 10/2012 | Abe | G02F 1/167 359/296 |
| 2013/0241804 A1* | 9/2013 | Yang | G06F 3/1423 345/3.1 |
| 2014/0077301 A1* | 3/2014 | Gai | H01L 27/124 257/355 |
| 2014/0078035 A1* | 3/2014 | Sato | G09G 3/344 345/107 |
| 2014/0168282 A1 | 6/2014 | Mun | |
| 2014/0333563 A1* | 11/2014 | Saitoh | G09G 3/3648 345/173 |
| 2015/0145822 A1* | 5/2015 | Katsuta | G06F 3/044 345/174 |
| 2015/0213762 A1* | 7/2015 | Xia | G09G 3/3266 345/215 |
| 2016/0027146 A1 | 1/2016 | Kim et al. | |
| 2016/0055811 A1* | 2/2016 | Zhu | G09G 3/3648 345/214 |
| 2016/0093270 A1 | 3/2016 | Lee et al. | |
| 2017/0077593 A1* | 3/2017 | Cheng | H01Q 1/243 |

* cited by examiner

ELECTRONIC PAPER DISPLAY DEVICE

CROSS-REFERENCE TO RELATED APPLICATION

This application claims the priority benefit of China application serial no. 201610805690.7, filed on Sep. 7, 2016. The entirety of the above-mentioned patent application is hereby incorporated by reference herein and made a part of this specification.

BACKGROUND OF THE INVENTION

1. Field of the Invention

The invention relates to a display device, and more particularly, to an electronic paper display device.

2. Description of Related Art

With the progress of electronic technology, applications related to electronic paper have become increasingly popular in our daily life, and can allow an electronic paper display panel provided and designed based on user demand for high display resolution or low display resolution. However, in current production of the electronic paper display device, because a circuit layout space and production costs are required for disposing a driving circuit of the electronic paper display panel, the circuit layout space is quite limited. Therefore, to improve range of application and save the circuit layout space so the electronic paper display device may be favorably integrated with other functional circuits, it is currently an important issue to be addressed as how to reduce the production costs and save the circuit layout space for the electronic paper display device. In view of the above, several embodiments of the invention are provided as follows.

SUMMARY OF THE INVENTION

The invention is directed to an electronic paper display device, which is capable of saving the circuit layout space and reducing the production costs.

The electronic paper display device of the invention includes an electronic paper display substrate and a power supply circuit. The electronic paper display substrate has an electronic paper display panel and a driving circuit thereon. The power supply circuit is electrically connected to the electronic paper display panel and the driving circuit. The power supply circuit is configured to output a first driving signal to the electronic paper display panel and output a voltage signal to the driving circuit. The power supply circuit includes a level shifter. The power supply circuit outputs a first driving signal to the electronic paper display panel by utilizing the level shifter. The driving circuit includes a source driver. The driving circuit outputs a second driving signal to the electronic paper display panel according to the voltage signal by utilizing the source driver.

In an embodiment of the invention, the electronic paper display device further includes a timing controller (TCON). The timing controller is configured to provide a first control signal to the power supply circuit, so that the power supply circuit is configured to decide an output timing for a first driving signal by utilizing the level shifter.

In an embodiment of the invention, the timing controller is not disposed on the electronic paper display substrate. The timing controller s electrically connected to the driving circuit and the power supply circuit, so as to control the output timing for the first driving signal and the second driving signal.

In an embodiment of the invention, the timing controller further provides a second control signal to the driving circuit, so that the driving circuit is configured to decide the output timing for the second driving signal by utilizing the source driver.

In an embodiment of the invention, the timing controller is disposed on a printed circuit board.

In an embodiment of the invention, the timing controller is disposed on the electronic paper display substrate, and the timing controller is integrated in the driving circuit.

In an embodiment of the invention, the driving circuit outputs the first control signal by utilizing the timing controller, so that the driving circuit is configured to control the output timing for the first driving signal and the second driving signal.

In an embodiment of the invention, the first driving signal is a gate driving signal, and the second driving signal is a source driving signal.

In an embodiment of the invention, the electronic paper display substrate is an array substrate, and the electronic paper display substrate includes a gate driving circuit.

In an embodiment of the invention, the electronic paper display substrate is a flexible substrate.

Based on the above, in the electronic paper display device according to the embodiments of the invention, the level shifter is integrated in the power supply circuit so the power supply circuit can directly provide the driving signal to the electronic paper display panel. Accordingly, the development costs may be effectively reduced while saving the circuit layout space.

To make the above features and advantages of the invention more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
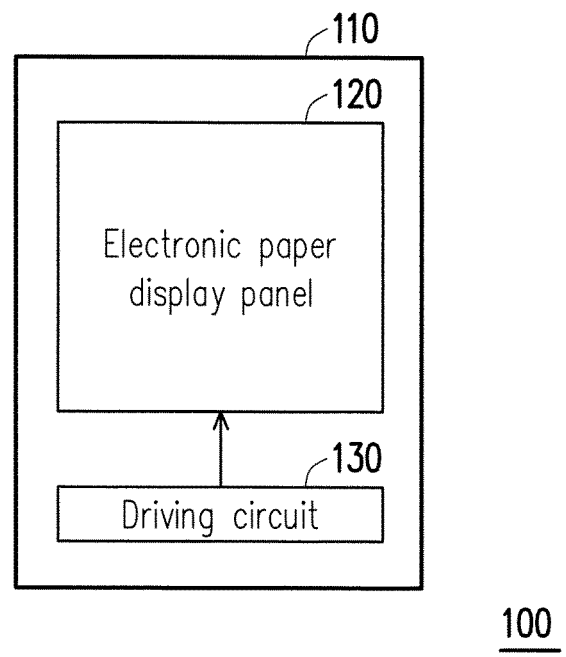
FIG. 1 is a block diagram illustrating an electronic paper display substrate in an embodiment of the invention.

Reference will now be made in detail to the present preferred embodiments of the disclosure, examples of which are illustrated in the accompanying drawings. Wherever possible, the same reference numbers are used in the drawings and the description to refer to the same or like parts.

Embodiments are provided below to describe the invention in detail, though the invention is not limited to the provided embodiments, and the provided embodiments can be suitably combined. The term "electrically connected" used in this specification (including claims) of the present application may refer to any direct or indirect connection means. In addition, the term "signal" can refer to a current, a voltage, a charge, a temperature, data, electromagnetic wave or any one or multiple signals.

FIG. 1 is a block diagram illustrating an electronic paper display substrate in an embodiment of the invention. Referring to FIG. 1, an electronic paper display device 100 includes an electronic paper display substrate 110. The electronic paper display substrate 110 may be a glass substrate or a flexible substrate. Further, the electronic paper display substrate 110 has an electronic paper display panel 120 and a driving circuit 130 thereon. The electronic paper display panel 120 and a driving circuit 130 are disposed on the electronic paper display substrate 110. The driving circuit 130 is electrically connected to the electronic paper display panel 120. In the present embodiment, the driving circuit 130 may include a source driver, which is configured to drive the electronic paper display panel 120. In this example, the electronic paper display substrate 110 is manufactured with a Gate-On-Array (GOA) technique. Namely, a gate driving circuit is directly manufactured inside the electronic paper display substrate 110. Because the electronic paper display panel 120 is disposed on the electronic paper display substrate 110, the electronic paper display panel 120 may be integrated with the gate driving circuit instead of externally connecting to the gate driving circuit on other circuit, substrate. Accordingly, the circuit layout space may be saved for the electronic paper display device 100 since the number of externally connected driving circuit chips may be reduced.

In the present embodiment, the electronic paper display panel 120 may be an electro-phoretic display (EPD) panel, an electro-wetting display (EWD) panel, a cholesteric liquid crystal display (CLCD) panel or other bi-stable display panels, which are not particularly limited by the invention.

Figure 2:
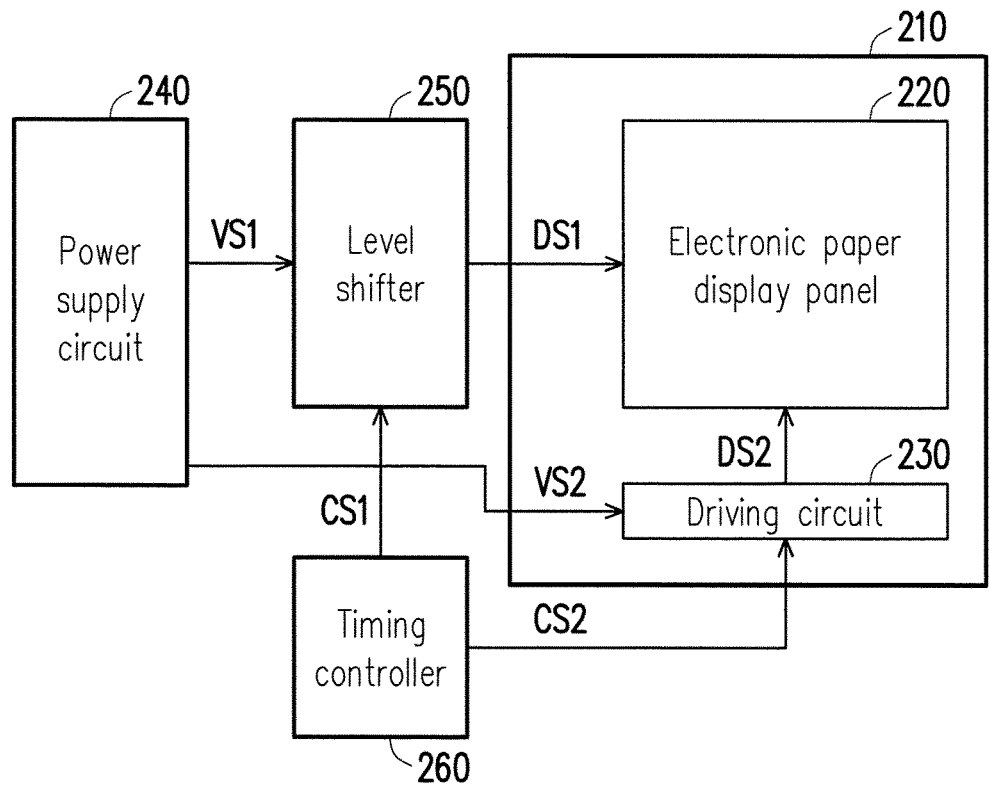
FIG. 2 is a block diagram illustrating an electronic paper display device in an embodiment of the invention.

FIG. 2 is a block diagram illustrating an electronic paper display device in an embodiment of the invention. Referring to FIG. 2, an electronic paper display device 200 includes an electronic paper display substrate 210, a power supply circuit 240, a level shifter 250 and a timing controller 260. An electronic paper display panel 220 and a driving circuit 230 are disposed on the electronic paper display substrate 210. The driving circuit 230 is electrically connected to the electronic paper display panel 220. In the present embodiment, the power supply circuit 240 outputs a first voltage signal VS1 to the level shifter 250 and outputs a second voltage signal VS2 to the driving circuit 230. In this example, the driving circuit 230 may further include a source driver.

The power supply circuit 240 may be a power management integrated circuit (PMIC), which is configured to provide multiple high/low operating voltage signals required by the driving circuit 230 and the level shifter 250. Specifically, the level shifter 250 can generate a first driving signal DS1 for the electronic paper display panel 220 according to the first voltage signal VS1. The driving circuit 230 can generate a second driving signal DS2 for the electronic paper display panel 220 according to the second voltage signal VS2. In the present embodiment, the first driving signal DS1 may be a gate driving signal, and the second driving signal DS2 may be a source driving signal. As such, the electronic paper display panel 220 can provide an image display function according to the first driving signal DS1 and the second driving signal DS2.

In an embodiment, the first driving signal DS1 may further include a high gate voltage (VGH) and a lower gate voltage (VGL), and the level shifter 250 can adjust its voltage size of the high/low gate voltage according to a driving specification of the electronic paper display panel 220, which is not particularly limited by the invention.

The timing controller 260 is configured to control an output timing for the first driving signal DS1 and the second driving signal DS2. The timing controller 260 is electrically connected to the driving circuit 230 and the level shifter 250. The timing controller 260 provides a first control signal CS1 to the level shifter 250 so the level shifter 250 can decide the output timing for the first driving signal DS1 according to the first control signal CS1. The timing controller 260 provides a second control signal CS2 to the driving circuit 230 so the driving circuit 230 can decide the output timing for the second driving signal DS2 according to the second control signal CS2. In this example, the power supply circuit 240, the level shifter 250 and the timing controller 260 may be disposed on an additional printed circuit board (PCB) in an externally-connecting manner and electrically connected to the electronic paper display panel 220 and the driving circuit 230 on the electronic paper display substrate 210.

Sufficient teaching and description regarding technical features of the electronic paper display substrate and the electronic paper display panel of FIG. 2 may be obtained from the embodiment of FIG. 1 and implementation thereof, which are not repeated hereinafter.

Figure 3:
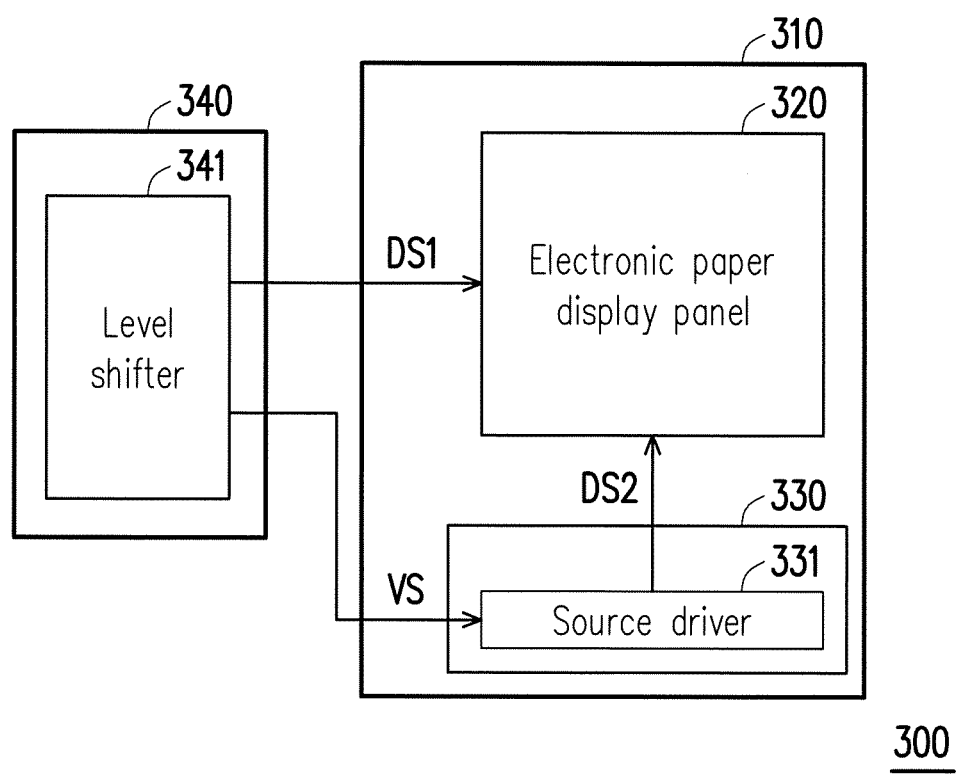
FIG. 3 is a block diagram illustrating an electronic paper display device in another embodiment of the invention.

FIG. 3 is a block diagram illustrating an electronic paper display device in another embodiment of the invention. Referring to FIG. 3, an electronic paper display device 300 includes an electronic paper display substrate 310 and a power supply circuit 340. An electronic paper display panel 320 and a driving circuit 330 are disposed on the electronic paper display substrate 310. The driving circuit 330 is electrically connected to the electronic paper display panel 320. In this example, the driving circuit 330 may include a source driver 331. The power supply circuit 340 is configured to provide a first driving signal DS1 to the electronic paper display panel 320 and provide a voltage signal VS to the source driver 331 of the driving circuit 330 so the source driver 331 can generate a second driving signal DS2 for the electronic paper display panel 320 according to the voltage signal VS.

In comparison with the embodiment of FIG. 2, the level shifter 341 of the present embodiment is integrated in the power supply circuit 340 so the power supply circuit 340 can utilize the level shifter 341 to output the first driving signal DS1 to the electronic paper display panel 320. In this way, the power supply circuit 340 can directly drive the electronic paper display panel 320 while providing the voltage required by the driving circuit 330 at the same time. That is to say, a circuit space of the electronic paper display device 300 required for externally disposing the level shifter 341 may be saved by integrating the level shifter 341 in the power supply circuit 340.

Figure 4:
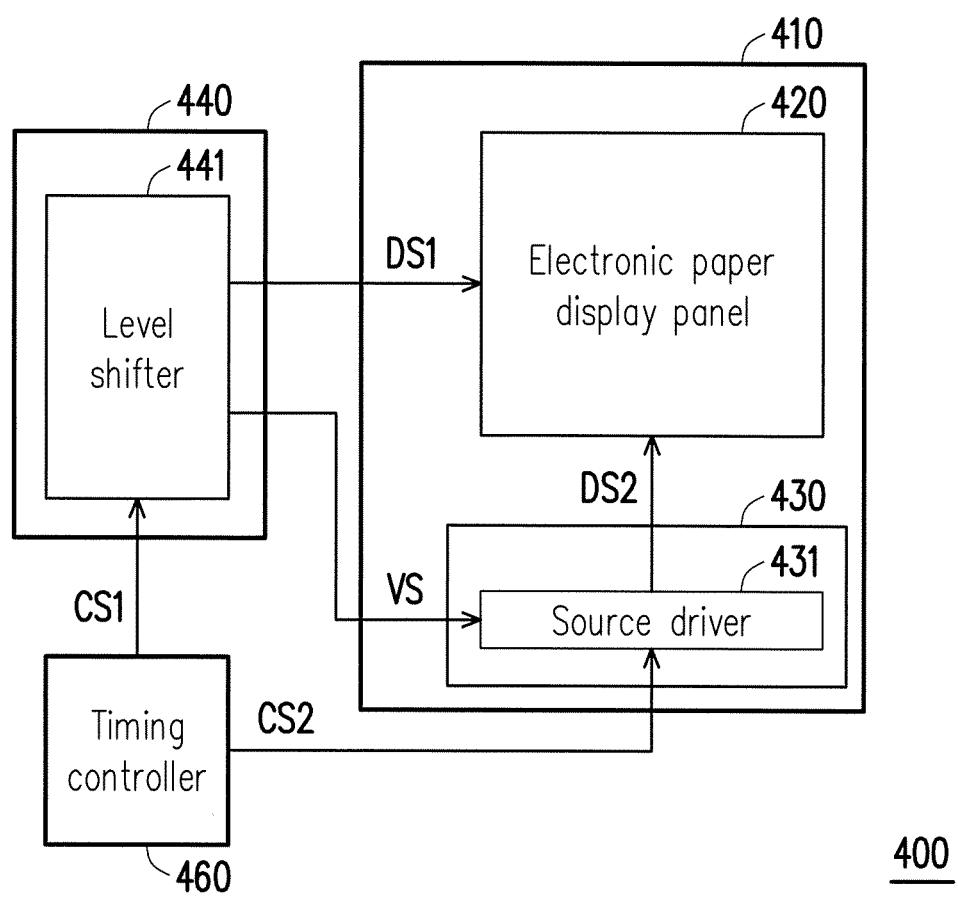
FIG. 4 is a block diagram illustrating an electronic paper display device in another embodiment of the invention.

FIG. 4 is a block diagram illustrating an electronic paper display device in another embodiment of the invention. Referring to FIG. 4, an electronic paper display device 400 includes an electronic paper display substrate 410 and a power supply circuit 440. An electronic paper display panel 420 and a driving circuit 430 are disposed on the electronic paper display substrate 410. Also, the driving circuit 430 is electrically connected to the electronic paper display panel 420. In the present embodiment, the driving circuit 430 includes a source driver 431. In this example, the power supply circuit 440 is configured to provide a first driving signal DS1 to the electronic paper display panel 420 and provide a voltage signal VS to the source driver 431 of the driving circuit 430 so the source driver 431 can generate a second driving signal DS2 for the electronic paper display panel 420 according to the voltage signal VS.

In this example, the electronic paper display device 400 further includes a timing controller 460, which is not disposed on the electronic paper display substrate 410 (e.g., which may be disposed on another circuit substrate) and is electrically connected to the driving circuit 430 and the power supply circuit 440. In this way, the timing controller 460 can provide a first control signal CS1 to the level shifter 441 integrated in the power supply circuit 440 and provide a second control signal CS2 to the source driver 431 integrated in the driving circuit 430. In this embodiment, the power supply circuit 440 can decide the output timing for the first driving signal DS1 according to the first control signal CS1, and the driving circuit 430 can decide the output timing for the second driving signal DS2 according to the second control signal CS2.

Specifically, a circuit space of the electronic paper display device 400 required for externally disposing the level shifter 441 may be saved because the level shifter 441 is integrated in the power supply circuit 440. Further, the timing controller 460 further included by the electronic paper display device 400 is configured to control the output timing for the first driving signal DS1 and the second driving signal DS2. Since the timing controller 460 is externally connected to the electronic paper display panel 420, the timing controller 460 may select its own memory size according to different resolution requirements, and may be applied in the electronic paper display panel with higher resolution requirement in particular. That is to say, the circuit scheme of the present embodiment is suitable for the electronic paper display panel with higher resolution requirement.

Figure 5:
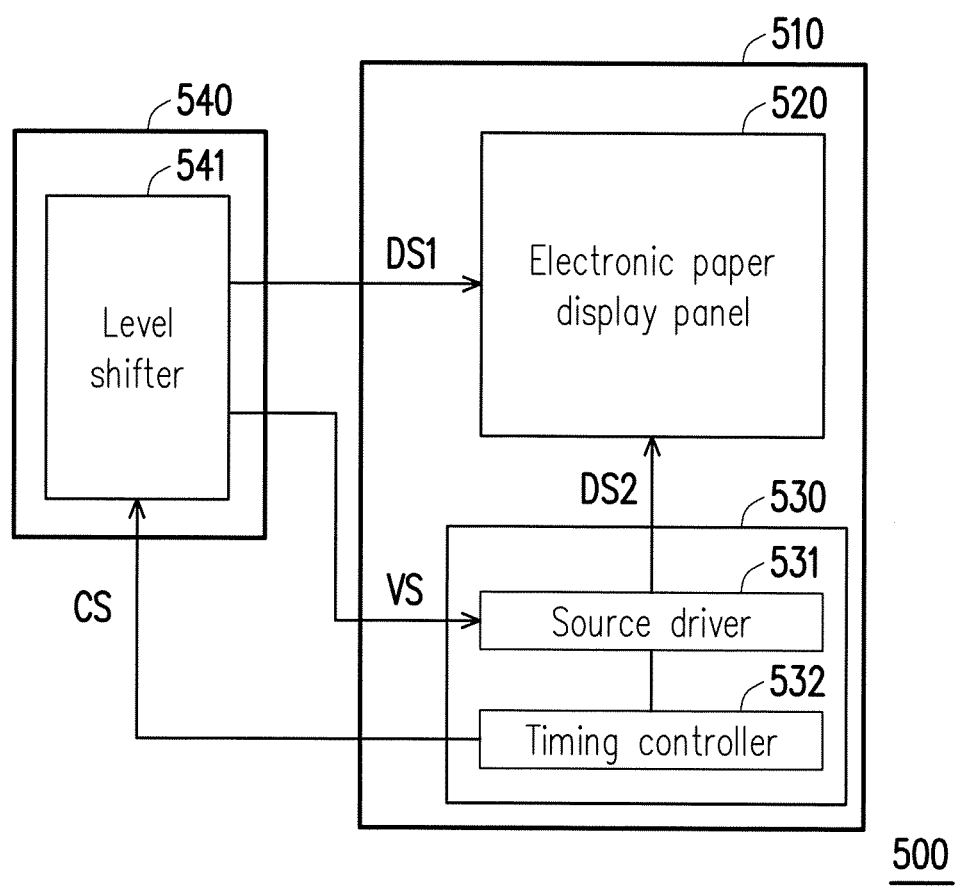
FIG. 5 is a block diagram illustrating an electronic paper display device in another embodiment of the invention.

FIG. 5 is a block diagram illustrating an electronic paper display device in another embodiment of the invention. Referring to FIG. 5, an electronic paper display device 500 includes an electronic paper display substrate 510 and a power supply circuit 540. An electronic paper display panel 520 and a driving circuit 530 are disposed on the electronic paper display substrate 510, which is electrically connected to the electronic paper display panel 520. In the present embodiment, the driving circuit 530 includes a source driver 531. The power supply circuit 540 is configured to provide a first driving signal DS1 to the electronic paper display panel 520 and provide a voltage signal VS to the source driver 531 of the driving circuit 530 so the source driver 531 can generate a second driving signal DS2 for the electronic paper display panel 520 according to the voltage signal VS.

In this example, the driving circuit 530 further includes a timing controller 532, which is disposed on the electronic paper display substrate 510 and integrated in the driving circuit 530. Therefore, the driving circuit 530 can utilize the timing controller to output a control signal CS to the level shifter 541 integrated in the power supply circuit 540 so the power supply circuit 540 can decide the output timing for the first driving circuit DS1 according to the control signal CS. Also, the driving circuit 530 can provide a second driving signal DS2 to the electronic paper display panel 520.

In the present embodiment, because the level shifter 541 is integrated in the power supply circuit 540 and the timing controller 532 is integrated in the driving circuit 530, a circuit space of the electronic paper display device 500 required for externally disposing the level shifter 541 and the timing controller 532 may be saved. Because the timing controller 532 is integrated in the driving circuit 530, the timing controller 532 is suitable for a control chip with smaller volume and smaller memory. That is to say, the circuit scheme of the present embodiment is suitable for the electronic paper display panel with lower resolution requirement.

In summary, according to the embodiments of the invention, the level shifter may be integrated in the power supply circuit in order to save the circuit layout space for the electronic paper display device. Also, the power supply circuit and the driving circuit of the electronic paper display device may be externally connected with the timing controller so the output timing for the driving signal configured to drive the electronic paper display panel may be controlled. Such circuit scheme is suitable for the electronic paper display panel with higher resolution requirement. Alternatively, the timing controller may also be integrated in the driving circuit of the electronic paper display device in order to save the circuit layout space. Such circuit scheme is suitable for the electronic paper display panel with lower resolution requirement. As a result, because the level shifter is integrated in the power supply circuit and whether or not the timing controller is disposed on the electronic paper display substrate may be selected according to the different resolution requirements in the invention, the development costs may be effectively reduced while saving the circuit layout space.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An electronic paper display device, comprising:
an electronic paper display substrate having an electronic paper display panel and a driving circuit thereon; and
a power supply circuit, electrically connected to the electronic paper display panel and the driving circuit, and the power supply circuit is configured to output a first driving signal to the electronic paper display panel and output a voltage signal to the driving circuit,
wherein the power supply circuit comprises a level shifter, and the power supply circuit outputs the first driving signal to the electronic paper display panel by utilizing the level shifter, wherein the driving circuit comprises a source driver, and the driving circuit outputs a second driving signal to the electronic paper display panel according to the voltage signal by utilizing the source driver,
wherein the electronic paper display panel is a gate on array panel, and the electronic paper display panel comprises a gate driving circuit manufactured inside the electronic paper display substrate, so that the gate driving circuit is integrated with the electronic paper display panel.

2. The electronic paper display device according to claim 1, wherein the electronic paper display device further comprises a timing controller, and the timing controller is configured to provide a first control signal to the power supply circuit, so that the power supply circuit is configured to decide an output timing for the first driving signal according to the first control signal by utilizing the level shifter.

3. The electronic paper display device according to claim 2, wherein the timing controller is not disposed on the electronic paper display substrate but electrically connected to the driving circuit and the power supply circuit, so as to control the output timing for the first driving signal and the second driving signal.

4. The electronic paper display device according to claim 3, wherein the timing controller further provides a second control signal to the driving circuit, so that the driving circuit is configured to decide the output timing for the second driving signal by utilizing the source driver.

5. The electronic paper display device according to claim 3, wherein the timing controller is disposed on a printed circuit board.

6. The electronic paper display device according to claim 2, wherein the timing controller is disposed on the electronic paper display substrate, and the timing controller is integrated in the driving circuit.

7. The electronic paper display device according to claim 6, wherein the driving circuit outputs the first control signal by utilizing the timing controller, so that the driving circuit is configured to control the output timing for the first driving signal and the second driving signal.

8. The electronic paper display device according to claim 1, wherein the first driving signal is a gate driving signal, and the second driving signal is a source driving signal.

9. The electronic paper display device according to claim 1, wherein the electronic paper display substrate is an array substrate.

10. The electronic paper display device according to claim 1, wherein the electronic paper display substrate is a flexible substrate.

* * * * *